UNITED STATES PATENT OFFICE.

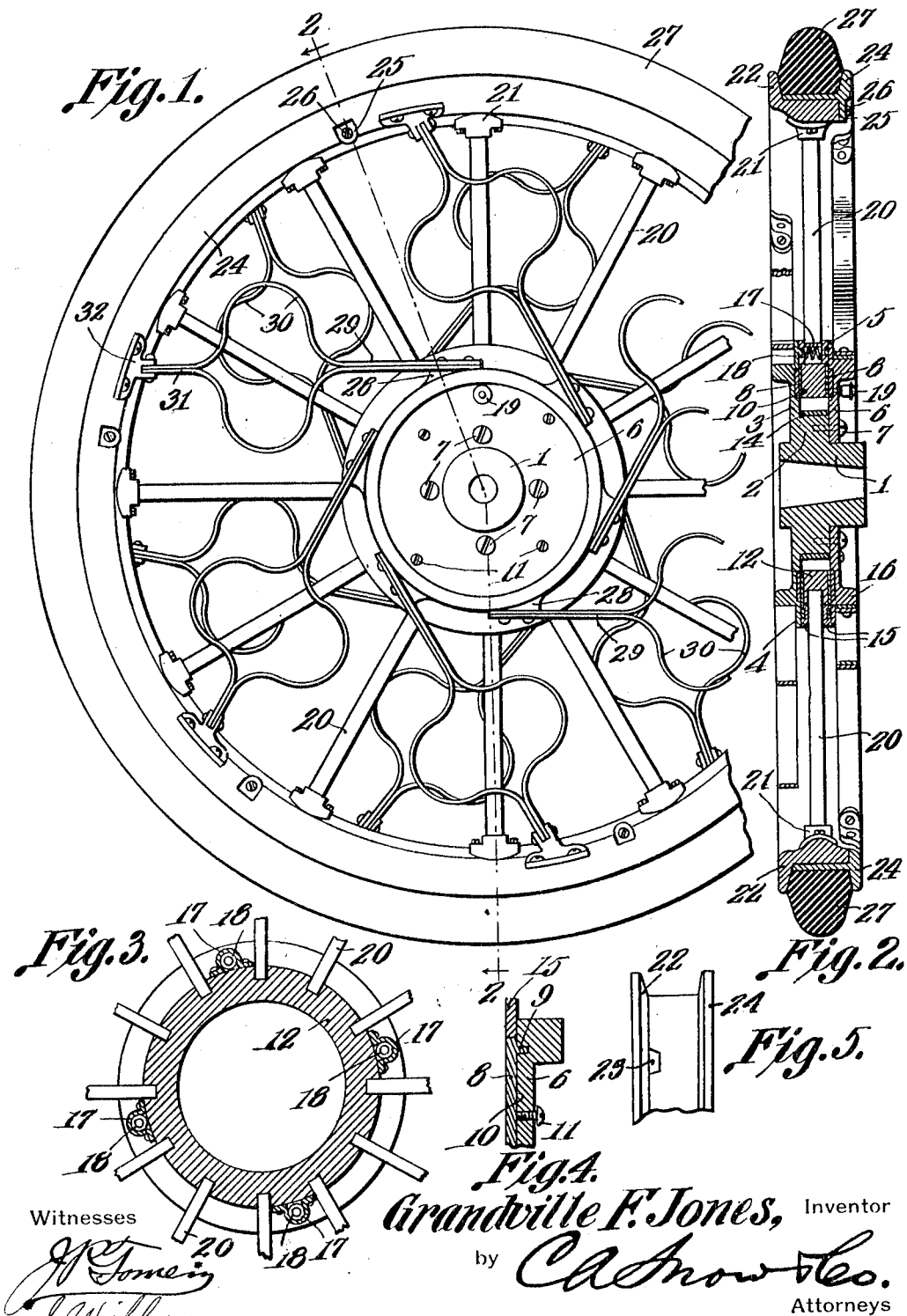

GRANDVILLE F. JONES, OF EXETER, NEBRASKA, ASSIGNOR OF ONE-FOURTH TO PERCY C. ZEIGLER AND ONE-FOURTH TO JULIA A. ZEIGLER, BOTH OF EXETER, NEBRASKA.

SPRING-WHEEL.

1,118,492.  Specification of Letters Patent.  Patented Nov. 24, 1914.

Application filed February 21, 1913. Serial No. 749,967.

*To all whom it may concern:*

Be it known that I, GRANDVILLE F. JONES, a citizen of the United States, residing at Exeter, in the county of Fillmore and State of Nebraska, have invented a new and useful Spring-Wheel, of which the following is a specification.

One object of this invention is to provide a resilient wheel in which the rim is connected with the hub by a series of springs, there being spokes fixed upon the rim and a spoke holder connected with the spokes, the spoke holder and the spokes constituting a rigid structure, adapted to come into contact with the hub when the springs yield, thereby limiting the movement of the rim with respect to the hub, under the action of the springs.

Another object of the invention is to provide a novel resilient structure for yieldably supporting the rim with respect to the hub.

Another object of the invention is to provide novel means for directing and controlling the movement of the spoke holder with respect to the hub.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings: Figure 1 shows the invention in side elevation, parts being broken away; Fig. 2 is a transverse section on the line 2—2 of Fig. 1; Fig. 3 is a section of the spoke holder and attendant parts; Fig. 4 is a sectional detail of a portion of the means whereby the movement of the spoke holder is controlled and directed; and Fig. 5 is a fragmental elevation of the rim.

The wheel herein disclosed comprises a hub which is a composite structure, the hub comprising a tubular bearing 1 provided intermediate its ends with a projecting flange 2. Outstanding beyond the periphery of the flange 2 and preferably formed integrally with the flange and with the tubular bearing 1 is a web 3, terminated at its periphery in an annular extension 4. Located opposite to the extension 4 and coöperating therewith is a ring 5, removably assembled with an annular hub plate 6 which fits over one end of the tubular bearing 1. Screws 7 or other connecting elements adapted to a like end, are employed for holding the hub plate 6 upon the flange 2 of the bearing 1.

Bearing rings 8 are provided, the web 3 and the annular hub plate 6 being recessed to receive these bearing rings. One bearing ring 8 lies within the annular extension 4 and the other bearing ring 8 lies within the ring 5. As shown most clearly in Fig. 4, the bearing rings 8 are provided with laterally extended pins 9 registering slidably in openings in the annular hub plate 6 and in the web 3. These pins 9 permit the bearing rings 8 to be adjusted toward and away from the median plane of the wheel. The bearing rings 8 are provided upon their inner surfaces with facings 10 which may be fashioned from hard steel. The bearing rings 8 are adjusted toward and away from the median plane of the wheel by means of set screws 11, the set screws 11 being threaded into the web 3 and into the annular hub plate 6.

A spoke holder is provided, the same preferably taking the form of a rigid ring 12 which surrounds the tubular bearing 1, the ring 12 being slidably received between the facings 10. Obviously, by adjusting the set screws 11, the bearing rings 8 and their facing 10 may be made to coöperate properly with the spoke ring 12, so as to direct the sliding movement of the spoke ring with respect to the bearing 1. The bearing 1 is surrounded by a resilient buffer 14. When the rim portion of the wheel is under sufficient stress, the spoke ring 12 is brought into abutment with the buffer 14.

Inclosing the bearing rings 8 (see Fig. 2) are auxiliary rings 15. The inner faces of the auxiliary rings 15 carry packing rings 16, which may be fashioned from leather or the like. Secured to the spoke ring 12, transversely of the same, are tubular casings 17 containing compression springs 18. These springs 18 bear against the auxiliary rings 15 and force the auxiliary rings 15 in opposite directions, away from the median plane of the wheel, so that the packing rings 16 coöperate, respectively, with the extension 4 and with the ring 5, a dust tight joint being thereby effected. An oil cup 19 may be located upon any desired portion of the wheel hub, say, for instance, upon the annular hub plate 6. The oil cup 19 discharges within the wheel and serves to lubricate the spoke ring 12 during its movement transversely of the bearing 1.

Projecting from the spoke ring 12 are rigid spokes 20 received in sockets 21, the sockets 21 being secured to a main rim section 22, the section 22 being provided in its tread as shown in Fig. 5, with lugs 23 registering in corresponding recesses formed in an auxiliary rim section 24, to the end that the rim sections may not have relative circumferential movement. The section 24 is provided with ears 25 adapted to receive bolts 26 or the like, whereby the rim sections 22 and 24 are secured together. The tire 27, which may be of any desired form, is supported by the rim sections 22 and 24. The sockets 21 are adapted to slide upon the spokes 20 toward the hub of the wheel, the construction being such that the rim may be brought into alinement with the spokes 20, whereupon, the sockets 21 may be slid outwardly, toward the ends of the spokes and be secured to the main rim section 22.

Resilient structures connect the hub with the rim, upon both sides of the spokes 20. But one of these structures will be described in detail. The tubular bearing 1 is provided with a plurality of shoulders 28, the outer faces of which extend tangentially of the wheel. To the shoulders 28 are secured the inner arms 29 of oppositely curved springs 30, the outer arms of which are secured to saddles 32, which in turn are connected to the wheel rim. The arms 29 and 31 of each spring upon one side of the wheel lie in a plane which intersects the plane in which are located the arms 29 and 31 of the spring upon the opposite side of the wheel, as will be understood when Fig. 1 is examined. The springs comprise open central loops disposed approximately parallel to the median plane of the wheel, the loops of the springs upon one side of the wheel being overlapped circumferentially of the wheel, upon the loops of the springs which are located upon the opposite side of the wheel.

From what has been said hereinbefore, it will be obvious that the spoke holding ring 12 is directed and guided in its sliding movement transversely of the tubular bearing 1. In practical operation, the springs serve to hold the rim yieldingly in place with respect to the hub, but, under an excessive strain, the spoke holding ring 12 will come into abutment with the yieldable buffer 14 and thus the strain will be carried into the rigid spokes 20, the springs being relieved from the strain.

The device is so constructed that it may be set up and taken down readily, the desired resiliency, coupled with the secondary necessary rigidity, being afforded.

Having thus described the invention, what is claimed is:—

A spring wheel comprising a hub; a rim; and springs connecting the hub and the rim, the springs each comprising alined, straight, end portions, the end portions of the respective springs being disposed tangentially of the hub and in intersecting planes, the springs comprising open, intermediate loops disposed approximately parallel to the median plane of the wheel and overlapped circumferentially of the wheel.

In testimony that I claim the foregoing as my own, I have hereto affixed my signature in the presence of two witnesses.

GRANDVILLE F. JONES.

Witnesses:
T. B. FARMER,
W. J. HILDRETH.